United States Patent
Petridis et al.

(10) Patent No.: US 7,274,986 B1
(45) Date of Patent: Sep. 25, 2007

(54) VEHICLE ENGINE SYSTEM HAVING PREDICTIVE CONTROL FUNCTION

(75) Inventors: Themi Petridis, London (GB); Klemens Grieser, Langenfeld (DE)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 11/424,210

(22) Filed: Jun. 14, 2006

(51) Int. Cl.
*F02D 13/02* (2006.01)
(52) U.S. Cl. ........................ 701/102; 123/295
(58) Field of Classification Search ................ 701/102, 701/101, 200; 123/295, 305, 436
See application file for complete search history.

(56) References Cited

U.S. PATENT DOCUMENTS

| | | | |
|---|---|---|---|
| 5,782,092 A | 7/1998 | Schultalbers et al. | |
| 5,924,406 A | 7/1999 | Kinugasa et al. | |
| 6,026,781 A | 2/2000 | Imatake et al. | |
| 6,216,676 B1 | 4/2001 | Gotoh et al. | |
| 6,233,921 B1 * | 5/2001 | Enderle et al. | ............. 123/295 |
| 6,302,081 B1 * | 10/2001 | Moser et al. | ............... 123/295 |
| 6,953,024 B2 | 10/2005 | Linna et al. | |
| 2005/0177308 A1 | 8/2005 | Tange et al. | |

* cited by examiner

*Primary Examiner*—Hieu T. Vo
(74) *Attorney, Agent, or Firm*—Allan J. Lippa; Alleman Hall McCoy Russell & Tuttle LLP

(57) ABSTRACT

An engine system for a vehicle, comprising at least one cylinder configured to vary operation between a spark ignition mode and a homogeneous charge compression ignition mode; a navigation system configured to receive navigation information and/or one or more human/machine interface (HMI) sensors; a control system for varying operation of the engine between the spark ignition mode and the homogeneous charge compression ignition mode responsive at least to one of the navigation information and HMI sensor information, where the information is used by the control system to affect transitions into the homogeneous charge compression ignition mode differently than transitions out of homogeneous charge compression ignition mode is provided.

20 Claims, 8 Drawing Sheets

VEHICLE ENGINE SYSTEM HAVING PREDICTIVE CONTROL FUNCTION

BACKGROUND AND SUMMARY

Some vehicles may include engines that are configured to vary operation between two or more operating modes. In one example, an engine may be configured to operate in a spark ignition (SI) mode during some conditions and a homogeneous charge compression ignition (HCCI) mode (e.g. which uses controlled autoignition or CAI) under other conditions. By varying operation between SI mode and HCCI mode, efficiency gains may be achieved and emissions may be reduced, while still meeting desired engine output demands.

Engine modes may be selected based on engine operating conditions. For example, as the engine speed or torque is increased to a specific threshold, the engine may be transitioned from HCCI to SI mode so that driver torque demands are met. In another example, when the engine load is within a particular range, the engine may be transitioned from SI to HCCI mode so that fuel efficiency may be increased.

As excessive mode switching may be an issue, one approach to reduce mode switching in an engine with multiple modes is described in U.S. Pat. No. 6,026,781. In the '781 patent, transitions between stratified and premixed spark-initiated combustion may be based on geographical information provided by a navigation system. In this way, certain transitions may be avoided. Further, this approach discloses transitioning from stratified to premixed spark-initiated combustion when the vehicle sharply accelerates and the torque becomes insufficient.

The inventors herein have recognized several issues that may occur in trying to apply the approach of '781 to an HCCI/SI engine. Specifically, because engine torque increases and/or decreases may be achieved more rapidly in SI operation than HCCI operation, the above modifications to mode transitions thresholds may result in the inability of the vehicle to respond rapidly to a driver's request. Further, because mode transitions into/out of HCCI operation may be slower than SI operation, relying on a mode transition when rapid acceleration is requested may be insufficient in some circumstances.

In one example, the disadvantages described above may be addressed by an engine system for a vehicle, comprising: at least one cylinder configured to vary operation between a spark ignition mode and a homogeneous charge compression ignition mode; a navigation system configured to receive navigation information; and a control system for varying operation of the engine between the spark ignition mode and the homogeneous charge compression ignition mode responsive at least to said navigation information, where said information is used by the control system to affect transitions into HCCI mode differently than transitions out of HCCI mode.

In this way, it may be possible to take into account navigation system information in selecting whether to transition operating modes, and further it may be possible to adjust mode transitions differently responsive to the navigation system information. Thus, the navigation information, along with the different performance capabilities between SI and HCCI combustion, may be used to provide improved mode selection and appropriate transitions. In one particular example, the control system may utilize different navigation criteria for transitions out of SI operation (or into HCCI operation) than transitions into SI operation (e.g., out of HCCI operation).

Further, in one example, the control system may vary said operation between the spark ignition mode and the homogeneous charge compression ignition mode responsive to a driving pattern of a vehicle operator driving the vehicle.

In this manner, future engine operating conditions may be predicted by navigation information and/or human/machine interface (HMI) measurements, thereby providing sufficient opportunity to transition between SI and HCCI modes. Further, transitions may be reduced, in some conditions, by reducing some transitions to modes that are predicted to be brief in duration or unsuitable for the predicted future operating conditions or the driving pattern of the vehicle operator.

DETAILED DESCRIPTION

Figure 1:
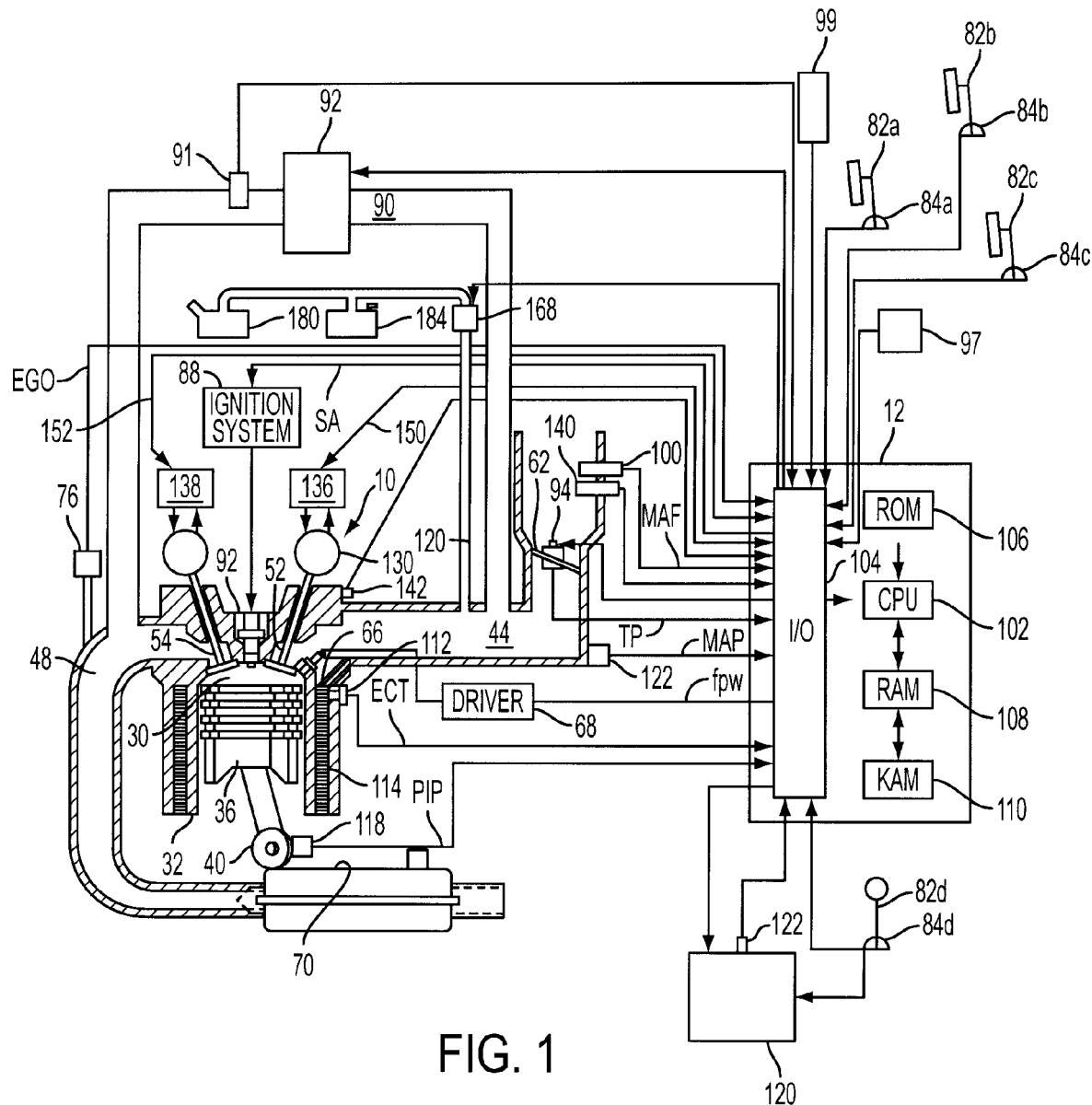
FIG. 1 is a schematic diagram of an example engine.

FIG. 1 shows one cylinder of a multi-cylinder engine that may be used for propelling a passenger vehicle. FIG. 1 shows internal combustion engine 10 controlled by a control system including an engine controller 12. Combustion chamber 30 of engine 10 may include combustion chamber walls 32 with piston 36 positioned therein and which is connected to crankshaft 40. A starter motor (not shown) may be coupled to crankshaft 40 via a flywheel (not shown). Combustion chamber 30 is shown communicating with intake manifold 44 and exhaust manifold 48 via respective intake valve 52 and exhaust valve 54. While FIG. 1 shows combustion chamber 30 having only one intake valve and one exhaust valve, it should be appreciated that combustion chamber 30 may include a plurality of intake and/or exhaust valves.

Fuel injector 66 is shown directly coupled to combustion chamber 30 for delivering injected fuel directly therein in proportion to the pulse width of signal fpw received from controller 12 via electronic driver 68. The fuel injector may be mounted in the side of the combustion chamber or in the top of the combustion chamber, for example. Fuel may be delivered to fuel injector 66 by a conventional high pressure fuel system, including a fuel tank, fuel pumps, and a fuel rail. In this manner, engine 10 may configured as a direct injection engine. In some embodiments, engine 10 may utilize port injection for delivering fuel to the combustion chamber instead of direct injection or port injection may be used in addition to direct injection.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC), which is also utilized during idle speed control.

Ignition system 88 provides an ignition spark to combustion chamber 30 via spark plug 92 in response to spark advance signal SA from controller 12, under selected operating modes. Though spark ignition components are shown, engine 10 (or a portion of the cylinders thereof) may be operated in a compression ignition mode, with or without an assist spark, as will be explained in more detail below. Further, in an alternative embodiment, the combustion chamber has no spark plug.

Exhaust gas sensor 76 is shown coupled to exhaust manifold 48 upstream of emission control device 70. Sensor 76 may include one or more of many sensors for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown downstream of exhaust manifold 48. The device may be a three way catalyst, NOx trap, various other devices, or combinations thereof.

Combustion chamber 30 may be configured with an intake camshaft 130 and an exhaust camshaft 132, where camshaft 130 is configured to actuate intake valve 52 among other intake valves of combustion chamber 30, and camshaft 132 is configured to actuate exhaust valve 54 among other exhaust valves of combustion chamber 30. The valves can be actuated via lift profiles on the camshafts, where the lift profiles between the different valves may vary in height, duration, and/or timing. However, alternative camshaft (overhead and/or pushrod) arrangements could be used, if desired. In another alternative embodiment, the intake valve (s) and/or exhaust valve(s) may be controlled by electronic valve actuation (EVA). In this manner, valve operation may be varied by controller 12.

Engine 10 may further include an exhaust gas recirculation (EGR) passage 90 configured to route a desired portion of exhaust gas from exhaust manifold 48 to intake manifold 44 via an EGR valve 92 controlled by controller 12. EGR passage 90 may include an EGR sensor 91 coupled to controller 12 for sensing EGR within EGR passage 90. In some embodiments, a portion of combustion gases may be retained in the combustion chambers by controlling exhaust valve timing. In this manner, controller 12 may vary the amount of EGR supplied to the combustion chamber. Engine 10 may include a fuel vapor recovery system enabling recovery of fuel vapors from fuel tank 180 and fuel vapor storage canister 184 via purge control valve 168 controlled by controller 12. In this manner, controller 12 may vary the amount of recovered fuel vapors supplied to combustion chamber 30.

Engine 10 may be at least partially controlled by driver inputs received from one or more driver controls or human/machine interfaces (HMIs) including an accelerator pedal 82*a*, a brake pedal 82*b*, a clutch pedal 82*c*, and/or a gear selector 82*d*. Further, operation of one or more of these driver controls may be determined by various sensors. For example, sensor 84*a* can be configured to detect the position, velocity, and/or acceleration of accelerator pedal 82*a*. Similarly, sensors 84*b*, 84*c*, and 84*d* can be configured to detect the operation of driver interfaces 82*b*, 82*c*, and 82*d*, respectively. For example, the gear selected via gear selector 82*d* may be detected by controller 12 via sensor 84*d*. In some embodiments, controller 12 may be further configured to receive additional driver inputs via driver interface 97, which may be a driver selectable switch to select a vehicle performance mode, such as an increased fuel economy mode.

A transmission 120 for transferring engine torque to at least one drive wheel of the vehicle may be a manual or automatic transmission, or combinations thereof. Further, transmission 120 may include one or more sensors shown generally at 122 for communicating transmission information to controller 12, including gear selection, gearbox conditions, transmission temperature, gear speeds, etc. As shown in FIG. 1, driver input via gear selector 82*d* and/or control system input via controller 12 may be used to control operation of transmission 120.

As will be described below in greater detail, these various driver inputs may be measured and processed by the control system where they may be used to predict future operating conditions of the engine. In this manner, engine control may be improved.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect (or other type) sensor 118 coupled to crankshaft 40; and absolute manifold pressure signal, MAP, from sensor 122.

Engine speed signal, RPM, is generated by controller 12 from PIP signal in a conventional manner and manifold absolute pressure signal MAP from a manifold pressure sensor provides an indication of vacuum, or pressure, in the intake manifold. Note that various combinations of the above sensors may be used, such as a MAF sensor without a MAP sensor, or vice versa. In one example, sensor 118, which is also used as an engine speed sensor, may be configured to produce a predetermined number of equally spaced pulses every revolution of the crankshaft.

In some embodiments, controller 12 may be configured to communicate with navigation system 99 to receive navigation information, for example. Navigation system 99 can receive navigation information from a variety of sources external the vehicle including satellite transmission or other transmitted signal. This information may include description of the present, approaching or future conditions of the roadway and/or traffic thereupon such as grade or speed limit, and ambient or environmental conditions such as pressure, altitude, and temperature, for example. Further, the information may include a classification of present, approaching or future roadways, such as city, country, highway, stop-and-go, etc. As will be described below in greater detail, controller 12 can be configured to vary some engine control operations and/or engine/transmission operating conditions responsive to the information received by navigation system 99.

As described above, FIG. 1 merely shows one cylinder of a multi-cylinder engine, and that each cylinder has its own set of intake/exhaust valves, fuel injectors, spark plugs, etc.

As will be described in more detail below, combustion in engine 10 can be of various types/modes, depending on operating conditions. In one example, a spark ignition (SI) mode can be employed where the engine utilizes a sparking device, such as spark plug to regulate the timing of combustion of an air and fuel mixture. In another example, a homogeneous charge compression ignition (HCCI) mode (i.e. controlled autoignition or CAI) may be employed where the engine utilizes compression of an air and fuel mixture to cause autoignition of the mixture, without requiring a spark being performed by a sparking device. In some conditions, engine operation in HCCI mode may result in greater fuel efficiency and/or reduced exhaust products as compared to SI mode. However, it may be difficult to achieve HCCI mode across all engine operating conditions, such as for example high load and/or speed.

Figure 2:
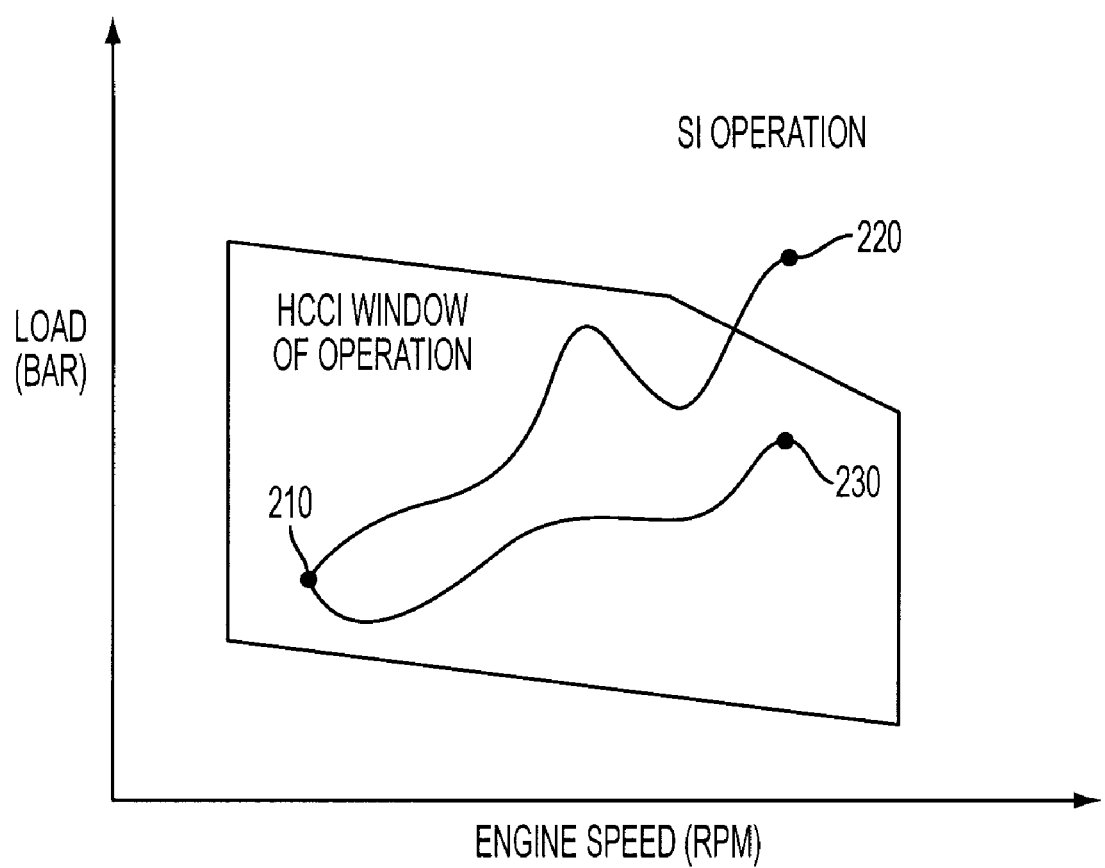
FIG. 2 is a graph showing operating conditions as compared to mode selection.

Therefore, in some examples, HCCI mode may be limited to an operating region where autoignition may be achieved, whereas SI mode may be used across a wider range of operating conditions. For example, FIG. 2 shows a graph comparing HCCI and SI operating modes for an example engine. The horizontal axis of the graph indicates engine speed, while the vertical axis indicates engine load. An HCCI window of operation is shown surrounded by an SI operating region defined by the vertical and horizontal axis.

In one example, the engine may be operated at a condition 210, which corresponds to an engine speed and load inside the HCCI window of operation. Thus, during engine operation at condition 210, the engine may be operated in HCCI mode. As the speed and/or load are varied (e.g. by the driver causing the engine and/or vehicle to accelerate via an adjustment of the accelerator pedal, brake, clutch, and/or gear selector), the engine may be operated at a condition 220, which corresponds to an engine speed and load outside of the HCCI window of operation. Thus, during engine operation at condition 220, the engine may be operated in SI mode. Alternatively, the speed and load may be varied to a condition 230, which corresponds to speed and load that is within the HCCI window of operation. Thus, during engine operation at condition 230, the engine may be operated in HCCI mode.

During operation of the engine, the control system may transition the engine between HCCI mode and SI mode, to realize efficiency gains and/or reduced emissions with HCCI mode operation when HCCI may be reliably achieved (e.g. during operation within the HCCI window) and utilize SI when HCCI may not be as readily achieved (e.g. during operation outside of the HCCI window). For example, during a transient engine operation where the operating conditions are adjusted from condition 210 to condition 220, a transition may be performed from HCCI mode to SI mode. In some embodiments, the transition may be performed at or just prior to exceeding the HCCI window of operation so that torque fluctuations (e.g. torque lag or spike) may be reduced. In this manner, transitions between combustion modes may be performed in a manner that reduces the driver perception of the transition. In another example, during a transient engine operation where the operating conditions are adjusted from condition 210 to condition 230, a transition may not be performed, since the HCCI window of operation was not exceeded. In yet another example, during a transient engine operation where the operating condition are adjusted from condition 220 to condition 210, a transition from SI mode to HCCI mode may be performed. In contrast to the HCCI to SI transition described above, the control system may be configured such that a transition to HCCI mode is not performed until the operating conditions are at or within the HCCI window of operation, thereby ensuring reduced torque fluctuations during the transition.

Transitions between SI and HCCI (or other modes) may utilize adjustments of one or more of the engine operating conditions as may be performed by the control system. As used herein, operating conditions may include spark timing, valve timing, valve lift height and/or duration, intake air heating or cooling, initial charge temperature, turbocharging or supercharging, fuel injection amount and/or timing, compression ratio, air/fuel ratio, throttle position, EGR amount and/or concentration, and engine output among others and combinations thereof. For example, when transitioning from SI mode to HCCI mode, the control system may increase the air/fuel ratio, while the initial temperature of the air charge delivered to the combustion chamber is increased so that autoignition may be attained at the desired combustion timing. In another example, when transitioning from HCCI mode to SI mode, the control system may reduce the initial temperature of the air charge so that preignition and/or knock are reduced. Therefore, during SI mode operation, the temperature of the air entering the combustion chamber may be controlled to be considerably lower than the temperature required for HCCI mode, which uses autoignition. While SI combustion may be utilized across a broad range of engine torque and speed it may produce increased levels of NOx and lower fuel efficiency when compared with other types of combustion.

During HCCI mode, when compression ignition of a pre-mixed air and fuel charge is utilized, fuel is normally homogeneously premixed with air, as in a port injected spark-ignited engine or direct injected fuel during an intake stroke, but with a high proportion of air to fuel. Since the air/fuel mixture is highly diluted by air or residual exhaust gases, which results in lower peak combustion gas temperatures, the production of NOx may be reduced compared to levels found in SI combustion. Furthermore, fuel efficiency while operating in a compression combustion mode may be increased by reducing the engine pumping loss, increasing the gas specific heat ratio, and by utilizing a higher compression ratio.

In compression ignition operation mode, it may be desirable to exercise close control over the timing of auto-ignition. The initial intake charge temperature directly affects the timing of auto-ignition. The start of ignition is not directly controlled by an event such as the injection of fuel in a standard diesel engine or the sparking of the spark plug in a spark ignited engine. Furthermore, the heat release rate is not controlled by either the rate or duration of the fuel-injection process, as in a diesel engine, or by the turbulent flame propagation time, as in a spark-ignited engine.

Note that auto-ignition is also a phenomenon that may cause knock in a spark-ignited engine. Knock may be undesirable in spark-ignited engines because it enhances heat transfer within the cylinder and may burn or damage the piston. In controlled compression ignition operation, with its high air-to-fuel ratio, knock does not generally cause degradation of the engine because the diluted charge keeps the rate of pressure rise low and the maximum temperature of the burned gases relatively low. The lower rate of pressure rise mitigates the damaging pressure oscillations characteristic of spark ignition knock.

In comparison to a spark ignition engine, the temperature of the charge at the beginning of the compression stroke typically may be increased to reach auto-ignition conditions at or near the end of the compression stroke. Numerous other methods may also be used to elevate initial charge temperature. Some of these include; heating the intake air (heat exchanger), keeping part of the warm combustion products in the cylinder (internal EGR) by adjusting intake and/or exhaust valve timing, compressing the inlet charge (turbocharging and supercharging), changing the auto-ignition characteristics of the fuel provided to the engine, and heating the intake air charge (external EGR).

During HCCI combustion, autoignition of the combustion chamber gas may be controlled to occur at a desired position of the piston or crank angle to generate desired engine torque, and thus it may not be necessary to initiate a spark from a sparking mechanism to achieve combustion. However, a late timing of the spark plug, after an auto-ignition temperature should have been attained, may be utilized as a backup ignition source in the case that auto-ignition does not occur.

In some conditions, transitions between modes may result in momentary loss in efficiency, torque disturbances and/or noise and vibration harshness (NVH), which may be perceivable by the driver. Thus, it may be desirable to reduce the number or frequency of transitions. Therefore, in some embodiments, the control system may be configured to reduce transitions through a variety of methods. In one example, the control system may be configured to not transition the engine to HCCI mode until within the HCCI window of operation by a specific margin. In this manner, the number or frequency of transitions between HCCI and SI modes may be reduced, thereby decreasing potential penalties resulting from each transition, such as increased emissions, decreased fuel economy, torque loss, NVH, and/or driver disruption. In some examples, the control system may utilize algorithm(s) that include hysteresis to reduce the number of transitions when the operating condition is at or near the boundary of the HCCI window of operation. Still further modifications to transition determinations are described below.

While FIG. 2 shows the HCCI window of operation defined in terms of engine speed and load, it should be appreciated that the HCCI window of operation may be defined by other operating conditions. For example, the control system may be configured to transition the engine between HCCI and SI operation responsive to engine temperature among other operating conditions.

The control system may also be configured to vary engine operation between modes responsive to a predicted condition, satellite navigation condition, driving pattern, or combinations thereof. For example, the control system may utilize past and/or present operating conditions as determined, for example, by various sensors, and additionally may utilize a prediction of future operating conditions to determine whether to transition between modes.

Figure 3:
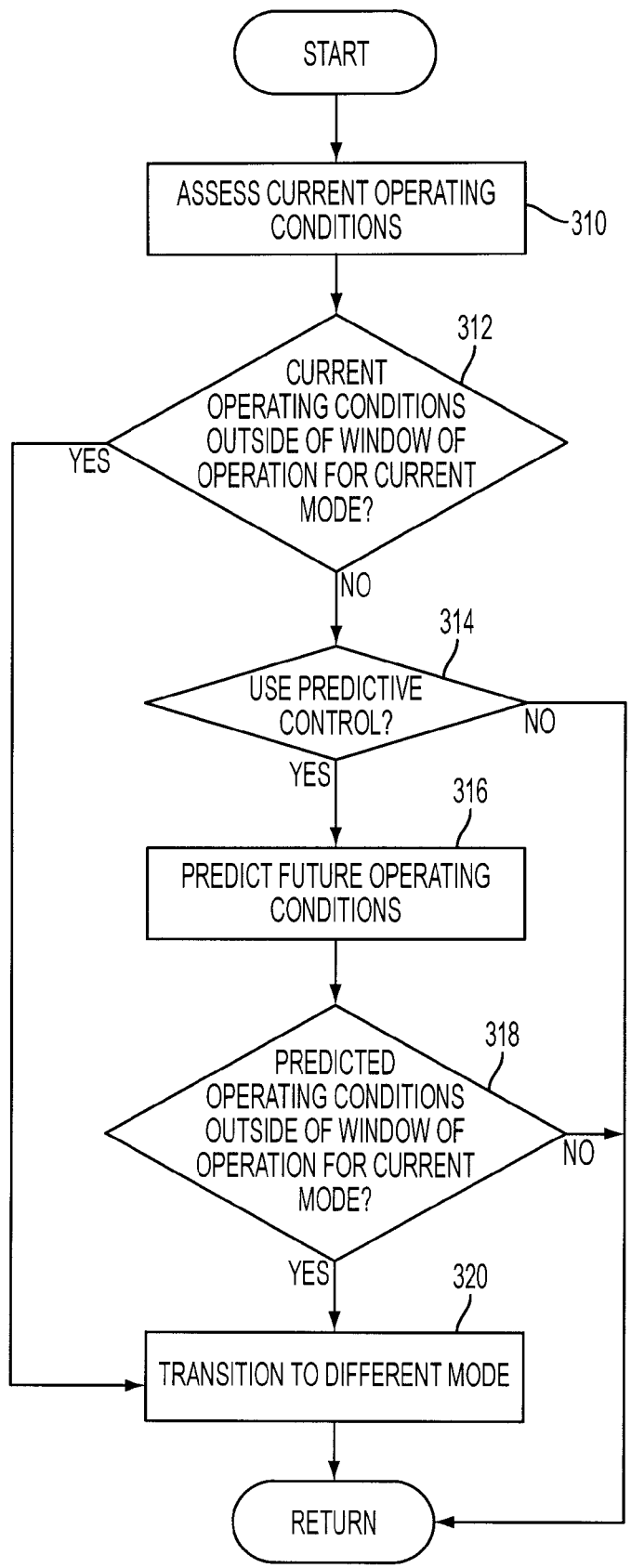
FIG. 3 is a flow chart for controlling mode transitions based on predictive control.

FIG. 3 provides an example routine for controlling transitions between modes responsive to predicted operating conditions. At 310, the control system may assess the current operating conditions. As described above, this assessment may be achieved by various sensors mounted on the engine and/or vehicle and/or estimations performed by the control system. At 312, the control system may determine whether the current operating conditions are near or outside of the window of operation for the current mode. For example, as described above with reference to FIG. 2, if the engine was currently operating in HCCI mode at condition 210, the control system may determine the answer at 312 to be no. Alternatively, if the engine was operating at condition 220, the control system may determine the answer to be yes.

Thus, if the answer at 312 is yes, the control system may transition the engine to a different mode at 320. For example, the control system may transition the engine from HCCI mode to SI mode. If the answer at 312 is no, the control system may determine at 314 whether to use predictive control. As will be described below in greater detail, predictive control may include the use of satellite navigation data and/or a learning algorithm based at least partially on driver input. If the answer at 314 is no, the routine may return to 310. Alternatively, if the answer at 314 is yes, the control system may predict future operating conditions at 316.

At 318, the control system may determine whether the future predicted operating conditions are near or outside of the window of operation for the current mode. For example, referring back to FIG. 2, it may be predicted that the engine load and/or speed may be increased from condition 210 to 220 over one or more engine cycles, which would result in a yes determination. Alternatively, if it is predicted that the engine load and/or speed are increased from 210 to 230 over one or more engine cycles, then the answer may be no. If the answer at 318 is no, the routine may return to 310. Alternatively, if the answer at 318 is yes, the control system may transition the engine to a different mode at 320, wherein the routine then may return to 310.

In this manner, the control system may utilize past, present, and predicted future operating conditions to control the engine operating mode and/or reduce the number and/or frequency of transitions, thereby increasing engine efficiency and reducing disruptions caused by the transitions.

As described above, predictive control may include the use of navigation information provided, for example, by satellite. In some embodiments, the navigation information received by the control system via the navigation system may include the physical position of the vehicle, roadway conditions such as road grade and speed limit, ambient conditions such as pressure and/or temperature, etc. The navigation information received by control system may be used to predict the future position and/or operating conditions of the vehicle.

Figure 4:
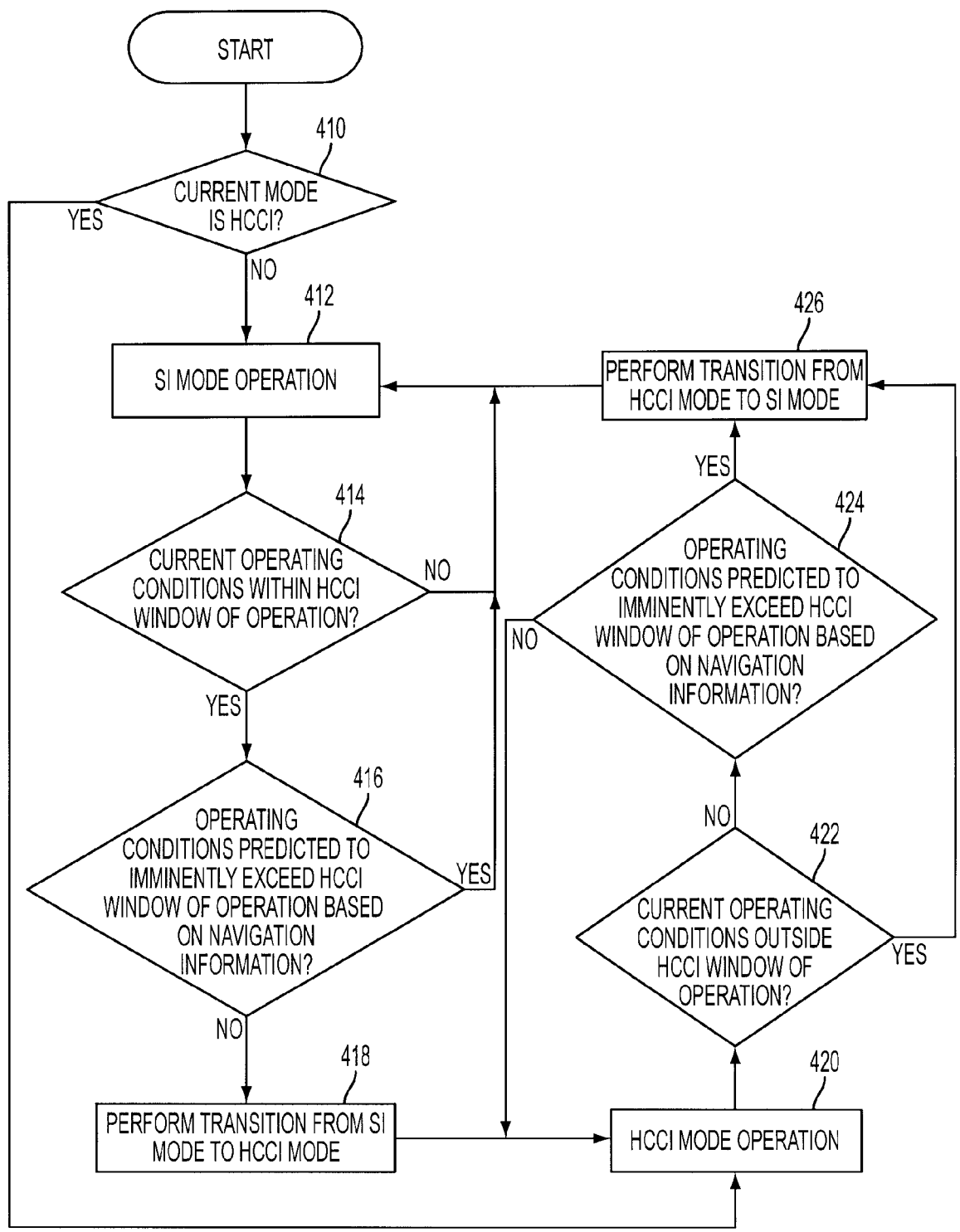
FIG. 4 is a flow chart for controlling mode transitions based on navigation information.

FIG. 4 provides an example routine for controlling transitions between modes responsive to predicted operating conditions based at least on navigation information received from an external source by the navigation system. The routine of FIG. 4 generally operates the engine in HCCI mode when possible so that engine efficiency may be increased and emissions may be reduced. At 410, the control system may determine whether the engine is currently operating in HCCI mode. If the answer is yes, the routine may proceed to 420. Alternatively, if the answer is no, the routine may proceed to 412. At 412, the engine is operated in SI mode. At 414, the control system may determine whether the current operating conditions are within the HCCI window of operation. If the answer is yes, the routine may proceed to 416. Alternatively, if the answer is no, the routine may return to 412 where SI mode is performed. At 416, the control system may determine whether the operating conditions are predicted to imminently (e.g. in 2 or 3 seconds or other time, or within a predetermined number of engine cycles, such as 5-10 cycles), exceed the HCCI window of operation based on navigation information. For example, if the navigation information indicates that the vehicle is approaching a portion of roadway having an increased grade, the control system may predict that the operating conditions may exceed the HCCI window of operation within an estimated time period, number of cycles, a certain distance traveled, or other measure. When it is predicted that the HCCI window of operation is to be imminently exceeded, the routine may return to 412 where SI mode is performed. Alternatively, if it is predicted that the HCCI window of operation will not be imminently exceeded, the routine may proceed to 418.

At 418, the control system may transition the engine from SI mode to HCCI mode, where at 420 HCCI operation is performed. At 422, the control system may determine whether the current operating conditions are outside the HCCI window of operation. If the answer at 422 is yes, the routine may proceed to 426. Alternatively, if the answer is no, the routine may proceed to 424. At 424, the control system may determine whether the operating conditions are predicted to imminently exceed the HCCI window of operation. If the answer at 424 is no, the routine may return to 420, where HCCI mode is performed. Alternatively, if the answer at 424 is yes, the control system may transition the engine from HCCI mode to SI mode at 426, where SI mode is performed at 412.

Figure 5:
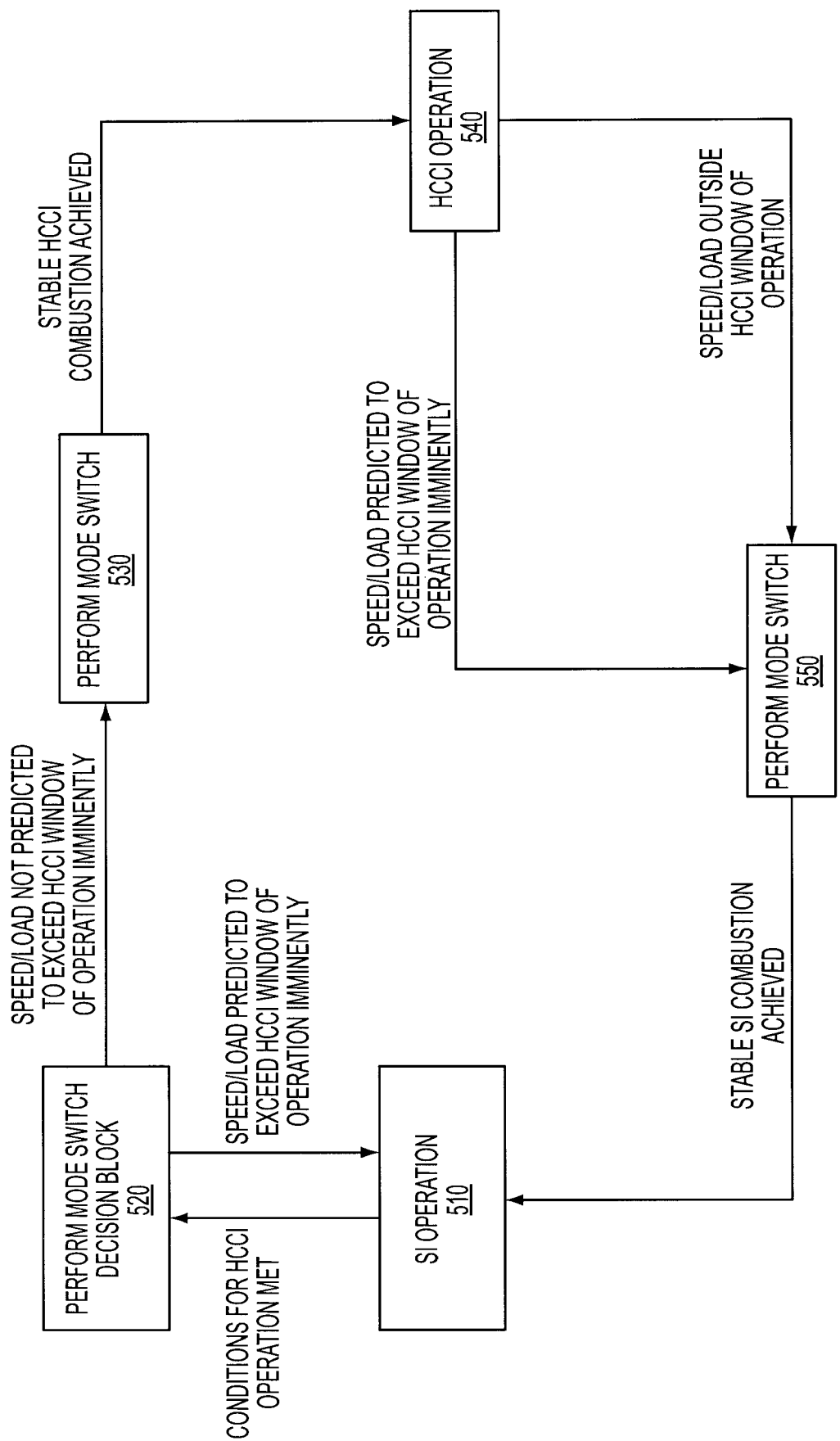
FIG. 5 shows schematically the routine of FIG. 4.

FIG. 5 shows schematically the routine of FIG. 4. Beginning at 510, the engine is operated in SI mode. If the conditions for HCCI operation have been met, the flow may move to the perform mode transition decision block 520. Within this block, navigation information may be assessed and if it is predicted that the speed/load trajectory is likely to exceed the HCCI window of operation within a short amount of time (for example 2-3 seconds, or any other such time) a transition may be made back to block 510 where SI mode is performed. Looping between blocks 510 and 520 may continue until both the conditions for HCCI operation are met (where the engine will continue operating in SI mode), and the speed/load trajectory is not predicted to exceed the HCCI window of operation within the aforementioned short time period. In this case, a transition may be made to block 530, where a mode switch may be performed. After the mode switch is performed and when stable HCCI combustion is achieved a transition is made into block 540 where the engine is operated in HCCI mode. Two possible exit scenarios exist from block 540. For example, if the speed or load exceeds the HCCI window of operation, then a transition may be made to block 550 where a mode transition is performed. However, whilst in block 540, if based on learned route information the speed/load trajectory is predicted to exceed the HCCI window of operation within a short amount of time (for example 2-3 seconds, or any other such time or duration or amount as noted herein), then a transition to block 550 may be made, wherein a mode switch out of HCCI operation is performed. Finally, when stable SI combustion is achieved, a transition is made back into block 510 where SI mode is performed.

As described above, various predictive control methods are possible. For example, in some embodiments, the control system may utilize information relating to various human machine interface (HMI) measurements such as accelerator pedal movements performed by the driver, and/or measurements of operating conditions such as engine speed and load. These measurements may be used by the control system to enable predictions to be made relating to future speed/load trajectories. For example, a routine may be used to monitor driver history, mapped against engine and vehicle operating conditions, in an effort to predict future engine/vehicle operation or other adjustments that will be generated by the driver.

Further, a learning algorithm may be used that would monitor driver behavior for scenarios such as vehicle acceleration in HCCI mode. Measurements such as accelerator pedal position, movement, rate of movement, and/or gear change information may be monitored during these scenarios. These measurements may be stored in the control system as speed/load trajectory categories such as those which remain within the HCCI window of operation and those which may require a transition to SI mode in order to meet the driver torque demands. For example, if it is predicted that a transition to SI mode is to be performed, the transition may be performed prior to exceeding the HCCI window of operation, thereby reducing torque lag that may be experienced by the driver. Furthermore, unnecessary transitions between modes may be reduced by predicting when the speed/load trajectory is likely to remain within the HCCI window of operation.

Figure 6:
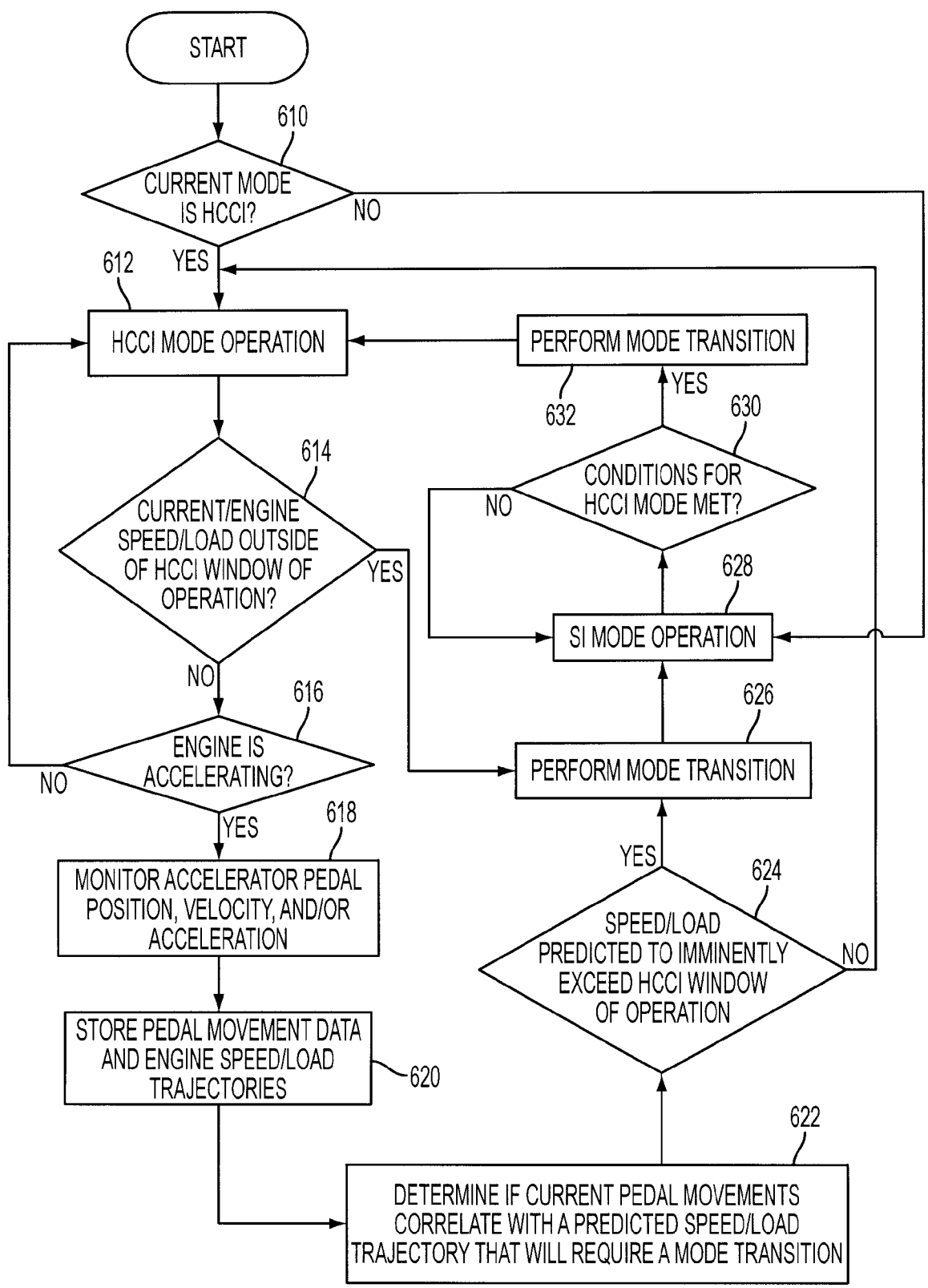
FIG. 6 is a flow chart for controlling mode transitions based on human machine interface measurements and predictions.

FIG. 6 provides an example routine for controlling transitions between modes responsive to predicted operating conditions based on HMI measurements and predicted speed/load trajectories. At 610, the control system may determine whether the engine is currently operating in HCCI mode. If the answer is yes, the routine may proceed to 612 where HCCI mode is performed. Alternatively, if the answer at 610 is no, the routine may proceed to 628 where SI mode is performed. At 614, the control system may determine whether the current engine speed and/or load are outside of the HCCI window of operation. If the answer is yes, the control system may transition the engine at 626 to perform SI mode at 628. Alternatively, if the answer at 614 is no, the control system may determine at 616 whether the engine is accelerating. In some embodiments, the control system may determine if the vehicle and/or engine are accelerating. If the answer is no, the routine may return to 612 where the engine is operated in HCCI mode. If the answer at 616 is yes, the control system may monitor the various driver inputs such as accelerator pedal position, velocity, and/or acceleration at 618, wherein the pedal position and engine speed and/or load trajectories may be stored in the control system. At 622, the control system may determine if the current pedal movements correlate with a predicted speed/load trajectory that may require a mode transition. While accelerator pedal operations are considered here with respect to 618 and 620, it should be appreciated that other driver interfaces such as a brake pedal, a clutch pedal, a gear selector, a user interface (e.g. 97), or other user inputs may be detected and used by the control system to provide predictive control of the engine. At 624, the control system may determine whether the speed/load is predicted to imminently exceed the HCCI window of operation. If the answer is no, the routine may return to 612. Alternatively, if the answer at 624 is yes, the control system may perform a mode transition at 626 to SI mode.

Figure 7:
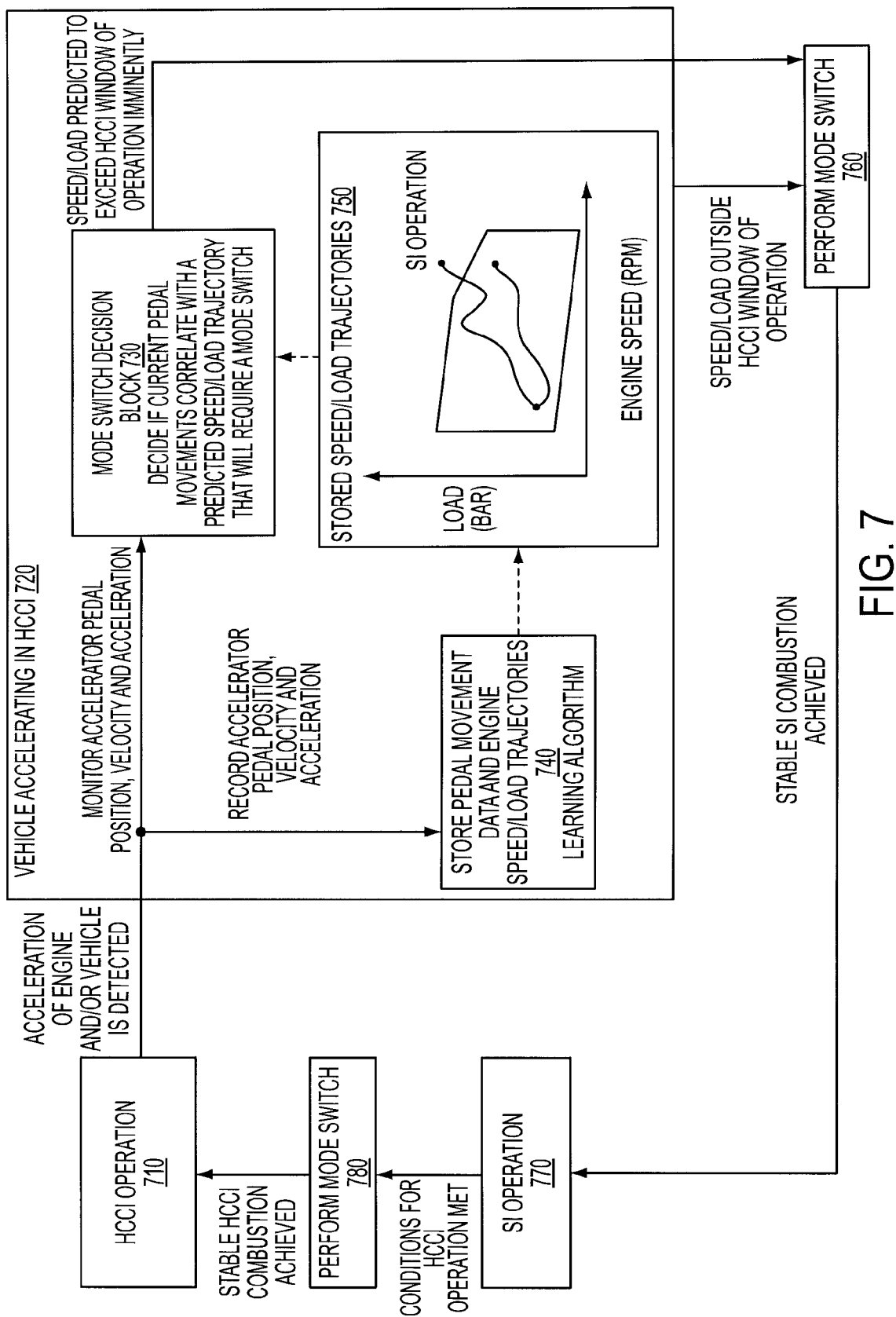
FIG. 7 shows schematically the routine of FIG. 6.

FIG. 7 shows schematically the routine of FIG. 6. The control flow, for example, may start in block 710, in which the engine is operating in stable HCCI mode. If engine and/or vehicle acceleration and/or deceleration are detected, a transition may be made into block 720. Within block 720, the accelerator pedal position, velocity and acceleration may be stored together with the engine speed/load trajectory in block 750. A learning algorithm may then be used to compile a matrix of categorized speed/load trajectories in block 750. The categories may be those trajectories that remain with the HCCI operation window and those that do not. The current accelerator pedal position, velocity and acceleration may be concurrently used in block 730, and compared with the stored speed/load trajectories in block 750. When this comparison is made and it is predicted that the speed/load trajectory is going to leave the HCCI window of operation, as soon as leaving the window becomes imminent, a transition may be made to block 760, where a transition to another mode is performed. Note that if the engine speed and load exceeds the HCCI window of operation at any time when in block 720, an immediate transition may be made to block 760. When in block 760, a mode switch to SI mode may be performed, and a transition may be made to block

770. From this state, if conditions for HCCI operation are subsequently met, a transition may be made to block 780, wherein the engine is transitioned from SI mode to HCCI mode. When HCCI combustion is achieved, the control flow may return to block 710.

As described above, transitions may be anticipated by information obtained, for example, by a navigation system and/or HMI measurements. In some embodiments, the frequency of transitions may be reduced by biasing the transition based on the transition direction. For example, SI mode to HCCI mode transitions may be difficult and/or time consuming to achieve, while transitions from HCCI mode to SI mode may be easier and/or more rapidly performed. Thus, the HCCI window of operation may be varied responsive to the information obtained by the navigation system and/or HMI measurements, as well as whether the transition is into or out of a certain mode, such as HCCI.

Figure 8:
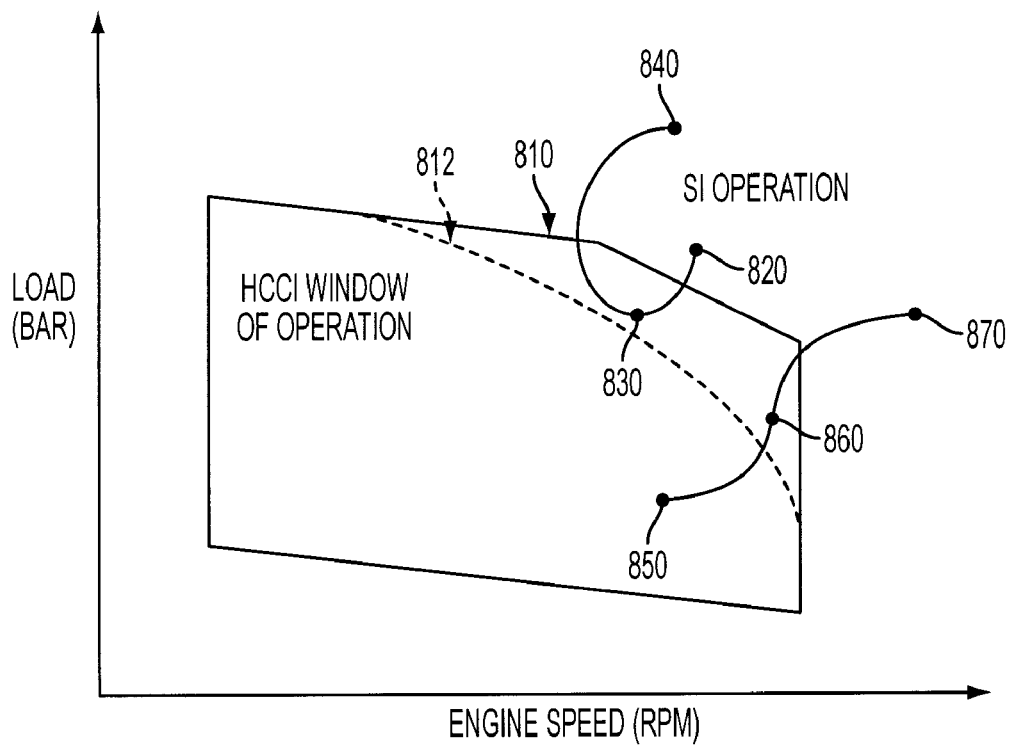
FIGS. 8 and 9 are graphs showing several example scenarios where transitions may be reduced.

FIG. 8 shows a graph illustrating the HCCI window of operation as defined by 810, as described above with reference to FIG. 2. The upper portion of the HCCI window of operation may be reduced from 810 to 812 based on navigation information and/or HMI measurements. Some transitions, such as transitions from HCCI to SI mode may be controlled to occur responsive to the HCCI window of operation defined by 810, while transitions from SI to HCCI mode, which may be more difficult or more time consuming to perform, may be controlled to occur responsive to the reduced HCCI window of operation.

For example, an engine that is initially operating in SI mode at condition 820 may remain in SI mode when passing through condition 830 toward condition 840, thereby reducing at least two transitions that would have occurred from SI mode to HCCI mode and back to SI mode. This scenario may occur, for example, when the grade of the roadway is reduced for a relatively short distance before increasing to a steeper grade. In this manner, the number of transitions may be decreased by predicting future operating conditions. In another example, an engine that is initially operating in HCCI mode at condition 850 may remain in HCCI mode as the operating conditions are varied to condition 860. As the operating conditions are further varied from condition 860 to 870, the engine may be transitioned at or before crossing the HCCI window of operation defined by line 810, wherein SI mode may be performed, for example, at 870.

Figure 9:
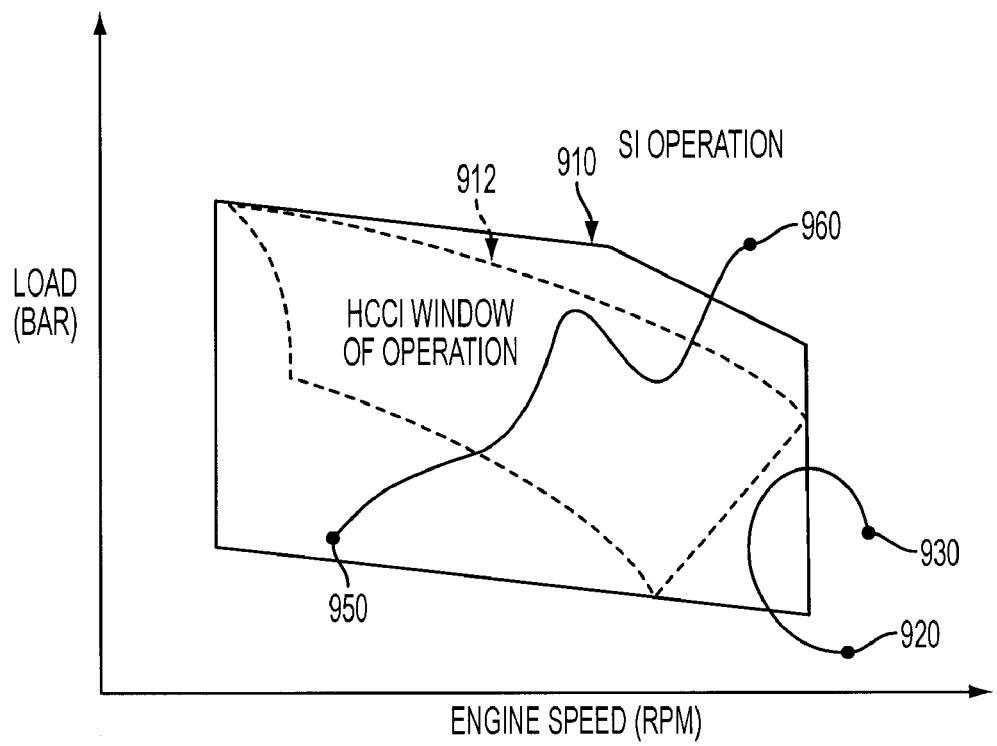

FIG. 9 shows another graph illustrating the HCCI window of operation as defined by 910 having a reduced HCCI window of operation defined at 912 by a broken line. In one example, an engine may be initially operating in HCCI mode at 950. As the engine speed and/or load are increased toward condition 960, the engine may remain in HCCI mode even as the operating conditions of the engine enter or exceed the reduced HCCI window of operation defined by 912. However, the engine may be transitioned to SI mode at or before crossing the boundary of the HCCI window of operation as defined by 910 when the operating conditions are varied toward condition 960. In this manner, the engine may remain in HCCI mode as long as possible so that increase efficiency and/or decreased emissions are achieved.

In another example, the engine may be initially operating in SI mode at condition 920. As the operating conditions of the engine are varied between conditions 920 and 930, the engine operating in SI mode may pass through the HCCI window of operation defined by line 910 in SI mode without transitioning to HCCI. In this manner, the number of transitions between HCCI and SI modes may be reduced when it is predicted that the engine may only briefly pass through the HCCI window of operation.

As described herein, transitions between combustion modes may be anticipated by the engine control system based on navigation information and/or predicted trajectories for various operating conditions. In this manner, transitions may be performed before operating conditions exist that may cause undesirable engine operation such as torque fluctuations and/or NVH. Along with these methods, adaptive learning algorithms may be applied that further improves the future predictive capability of the control system. Furthermore, some transitions, such as SI to HCCI may be biased so that the engine remains in SI mode unless the operating conditions are predicted to be substantially within the HCCI window of operation and/or are predicted to be within the HCCI window of operation for a substantial period of time.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

We claim:

1. An engine system for a vehicle, comprising:
    at least one cylinder configured to vary operation between a spark ignition mode and a homogeneous charge compression ignition mode;
    a navigation system configured to receive navigation information; and
    a control system for varying operation of the engine between the spark ignition mode and the homogeneous charge compression ignition mode responsive at least to said navigation information, where said information is used by the control system to affect transitions into the homogeneous charge compression ignition mode differently than transitions out of homogeneous charge compression ignition mode.

2. The system of claim 1 wherein said varying is further responsive to a vehicle condition including an engine condition and a driver input.

3. The system of claim 2, wherein said driver input includes an input provided by a driver to at least one of an accelerator pedal, a brake pedal, a clutch pedal, a transmission gear selector.

4. The system of claim 1 wherein said varying is further responsive to a driving pattern of a vehicle operator driving the vehicle.

5. The system of claim 1 wherein said varying is further responsive to future engine operating conditions predicted by the navigation information.

6. The system of claim 1 wherein said varying is further responsive to future engine operating conditions predicted by human/machine interface (HMI) measurements.

7. The system of claim 6, wherein said measurements include at least one of a position, a speed, and an acceleration of an accelerator pedal.

8. An engine system for a vehicle, comprising:
at least one cylinder configured to vary operation between a spark ignition mode and a homogeneous charge compression ignition mode;
a navigation system configured to receive navigation information; and
a control system for varying operation of the engine between the spark ignition mode and the homogeneous charge compression ignition mode responsive to at least said navigation information, where said navigation information is used by the control system to vary a threshold for enacting a transition into the homogeneous charge compression ignition mode differently than a threshold for enacting a transition out of the homogeneous charge compression ignition mode.

9. The system of claim 8 wherein the control system further includes storing and retrieving past driver operations, and selectively operating said at least one cylinder in one of the spark ignition mode and the homogeneous charge compression ignition mode responsive to the retrieved past driver operations.

10. The system of claim 9 wherein said varying is further responsive to a vehicle condition including an engine condition and a driver input.

11. The system of claim 10 wherein said varying is further responsive to a driving pattern of a vehicle operator driving the vehicle.

12. The system of claim 11 wherein said varying is further responsive to future engine operating conditions predicted by the navigation information.

13. The system of claim 12 wherein said future engine operating conditions include an approaching change in at least one of engine speed and engine torque.

14. The system of claim 13 wherein said varying is further responsive to future engine operating conditions predicted by human/machine interface (HMI) measurements.

15. The system of claim 14, wherein said measurements are based on a driver input from at least one of an accelerator pedal, a brake pedal, a clutch pedal, a gear selector, and a transmission state.

16. A method for operating a vehicle having an engine including at least one cylinder configured to vary operation between a spark ignition mode and a homogeneous charge compression ignition mode, the method comprising:
receiving data from a vehicle navigation system during vehicle operation, the data indicative of conditions being experienced or to be experienced by the vehicle;
transitioning operation of the at least one cylinder from spark ignition mode to homogenous charge compression ignition mode responsive at least to said data, engine operating conditions, and a driving pattern of a vehicle operator driving the vehicle; and
transitioning operation of the at least one cylinder from homogenous charge compression ignition mode to spark ignition mode responsive at least to said data, engine operating conditions, and said driving pattern of a vehicle operator driving the vehicle.

17. The method of claim 16 wherein the control system varies the operation of the engine from the spark ignition mode to the homogeneous charge compression ignition mode at a first threshold and varies the operation of the engine from the homogeneous charge compression ignition mode to the spark ignition mode at a second threshold different from the first threshold level.

18. The method of claim 17, wherein the difference between the first threshold and the second threshold varies with data received from the navigation system.

19. The method of claim 18 wherein the difference between the first threshold and the second threshold varies with changes of a driving pattern of a vehicle operator driving the vehicle.

20. The method of claim 17 wherein the data received by the navigation system includes at least one of a present road surface grade, an approaching road surface grade, an approaching traffic condition, an approaching speed limit condition, a present environmental condition, and an approaching environmental condition.

* * * * *